(No Model.)
A. BORNHOLDT.
EXTRACTING OR SEPARATING LIQUIDS FROM VEGETABLE SUBSTANCES.
No. 489,362. Patented Jan. 3, 1893.
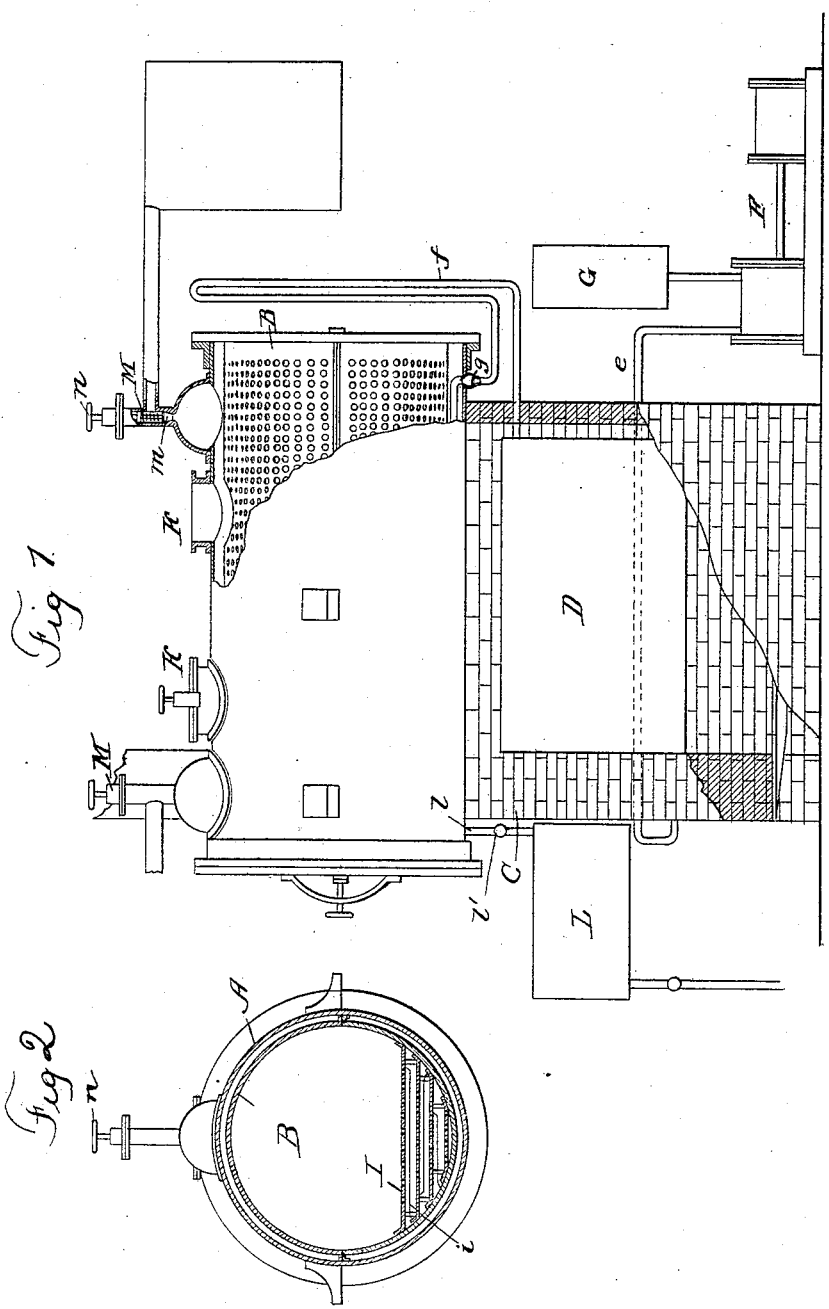

UNITED STATES PATENT OFFICE.

ADOLPH BORNHOLDT, OF BROOKLYN, NEW YORK, ASSIGNOR TO THE NATIONAL VACUUM DRYING AND AIR DISTILLING COMPANY, OF SAME PLACE.

EXTRACTING OR SEPARATING LIQUIDS FROM VEGETABLE SUBSTANCES.

SPECIFICATION forming part of Letters Patent No. 489,862, dated January 3, 1893.

Application filed February 26, 1892. Serial No. 422,919. (No specimens.)

*To all whom it may concern:*

Be it known that I, ADOLPH BORNHOLDT, a resident of Brooklyn, in the State of New York, have invented a new and useful Improvement in Extracting or Separating Liquids from Organic Substances, which improvement is fully set forth in the following specification.

This invention relates to the extraction of fluids or juices from vegetable or other organic substances, the object being to effect expeditiously and thoroughly the separation of all fluids from the tissue or solid parts of such substances.

The invention consists essentially in placing the substances to be treated in a tight vessel, adapted to withstand a high internal pressure, and then forcing into such vessel air, heated or not according to circumstances, until a very high degree of pressure is reached, whereby the fluid matters are driven out of the cells, pores or interstices of the solid mass, and complete exhaustion of the latter is effected.

The ordinary method of expressing, drying out, or extracting the fluids from vegetable matters containing the same, (such for example, as apples or grapes, in the manufacture of cider and wine) is by the use of a press having a disk or platen fitting in a cylinder, which disk or platen is forced down by a screw, lever or other means, squeezing the compressible substance into a smaller and smaller space, the liquid being squeezed out and flowing through perforations in the walls of the cylinder. The more the mass is compressed, the greater the force necessary to expel the remaining juices, and in consequence fine fibers are forced out with the juices. These fibers of course constitute impurities, and in some cases it is desirable to eliminate them altogether, which can only be done by careful filtration. Furthermore it is not possible in an ordinary press to extract the fluids completely. The interior parts of the compressible mass are never so well dried as the particles on the surface, partly because the elasticity of the mass opposes and diminishes the actual pressure, and partly because the outer surfaces become very hard and compact and so impede the escape of the juices from within.

By the method herein set forth, the substances treated are not compressed into a contracted space, but remain at the close of the operation in a loose, disintegrated condition. The air entering the compression chamber, occupies all the pores and interstices of the mass therein, pressing equally upon all sides of every separate piece or particle. As the pressure increases the outside tissues of the substance collapse, and the air displaces the juices which now begin to flow. The interior cells are now exposed in like manner to the action of the air pressure, and the operation continues until every minute cell is emptied of its fluid contents, and occupied by air. By this method the extraction is complete, and can be effected very expeditiously and with economy. The juices obtained are pure, and free from minute fibrous matters. But the invention is by no means limited to the treatment of this class of substances.

As another illustration of its industrial application, reference may be made to the treatment of the spent mash or refuse from distilleries or from starch factories. This refuse is now in large measure wasted for want of an efficient, economical and unobjectionable method of treatment, though it constitutes or contains valuable food for fattening cattle. This substance, however, speedily ferments, and in warm weather soon becomes offensive and worthless for any purpose. Moreover, the great bulk of the refuse makes it too expensive to transport to any considerable distance. The present methods of treating this refuse by evaporation, or by compression in ordinary presses, have not proved satisfactory, and are used only to a limited extent.

According to my invention the fluids are quickly expelled and the malt left in a loose, dry, condition, entirely freed from all deleterious and objectionable matters, and in a state suitable for feeding live stock.

The invention is also applicable to the extraction of dyes,—logwood for example. For this purpose the wood or bark is warmed up and moistened, and is in this condition subjected to the direct air pressure whereby all the soluble matters are forced out. The extraction by this process is not only much more thorough than by the steam process, producing a greater yield from the same quantity of stock, but the operation is much more economical of fuel. Moreover, as the operation is conducted at a low temperature there is no liability of injuring the dye-stuff by overheating, which is an advantage of great importance.

The extraction of other coloring matters from bodies containing the same, and of tan-liquor from tan-bark, hemlock and other vegetable substances, may be advantageously effected in like manner.

It will not be necessary to give other illustrations of industrial uses to which the invention may be applied, since it will be obvious from the examples given above, that the process is of very wide and general application.

While the invention is not limited to any special form of apparatus, it will, for the sake of greater clearness, be described in connection with the accompanying drawings, which illustrate a form of press suitable for the purpose.

Figure 1 is an elevation partly in section of an apparatus which may be used in carrying out the invention, and Fig. 2 is a cross-section of the press.

The said press consists of a strong tank or vessel A, adapted to withstand high pressure. Within this vessel is a perforated cylinder B, somewhat smaller than the interior diameter of the vessel A, so that an annular space is formed between the two. The press is supported upon a foundation of masonry C, which incloses an air storage and heating chamber D, beneath which is the grate E.

F represents an air pump having sufficient power to supply the necessary compression. The pipe e leads from the pump into the chamber D and pipe f from the latter to the lower part of the press, between the inner and outer cylinders. Pipe f is provided with a check valve g.

G represents a purifier of any suitable kind, through which the air is drawn by pump F.

The perforated cylinder B of the press contains a series of perforated shelves I of which there may be any desired number. Beneath each shelf is a drip pan or tray i, which catches the liquid flowing through the perforations of the shelf and conducts it to one side of the cylinder.

K K represent man-hole openings for giving access to the interior of the cylinders to charge them or to remove the residues.

L is a receptacle for the liquids which are thrown off by pipe l provided with a cock l'.

M M are the air and vapor discharge pipes provided each with an adjustable pressure retaining valve m, which can be regulated by the screw n to maintain any desired pressure in the cylinders A B.

The operation of the apparatus will be readily understood from the description already given. The substance from which the juices or fluids are to be extracted is introduced through the man hole openings into the inner cylinder B, the pressure valves are set to the proper point, and the cylinder A tightly closed. The pump is then put into operation and air forced into the storage chamber D, and thence into vessel A. If the operation requires warm air, which is preferable in some cases, a fire is maintained in the furnace beneath the chamber D. The air entering the vessel A has access through the numerous perforations of cylinder B to every part of the mass, filling the same, and exerts the same pressure upon the portions occupying the center of the cylinder, as on the outer portions. As soon as the pressure becomes sufficiently great the juices begin to flow through the perforations of the shelves I, and are conveyed by the drip pans i to the sides of the press, passing finally through pipe l to receptacle L. The operation of the pump is continued until the stock under treatment is exhausted of its fluid constituents. Some substances require for their treatment a higher degree of pressure than others, and the amount of pressure required will also depend somewhat upon the length of time within which it is desired to complete the extraction. In some cases it is advantageous to employ a pressure of a thousand pounds or more to the square inch.

I make no claim herein to the apparatus described and shown in the accompanying drawings, it being obvious that the invention is not dependent upon any particular apparatus. Moreover, such apparatus forms the subject matter of an application for Letters Patent filed by me February 26, 1892, Serial No. 422,920.

Having now described my said invention, what I claim and desire to secure by Letters-Patent is;—

1. The process of extracting or separating the fluid constituents from vegetable or other organic substances by subjecting such substances to the direct action of air under high pressure, and maintaining such pressure until the desired separation is effected, substantially as described.

2. The process of extracting or separating fluids from vegetable or other organic substances such as herein specified, by placing such substances in a tight vessel, and forcing into the latter air under high pressure sufficient to expel the fluids from the cells of such substances, substantially as described.

In testimony whereof I have signed this specification in the presence of two subscribing witnesses.

A. BORNHOLDT.

Witnesses:
 Jos. Glatz,
 H. N. Meeker.